US010393213B2

(12) United States Patent
Abe et al.

(10) Patent No.: US 10,393,213 B2
(45) Date of Patent: Aug. 27, 2019

(54) VIBRATION-DAMPING DEVICE

(71) Applicant: SUMITOMO RIKO COMPANY LIMITED, Komaki-shi, Aichi (JP)

(72) Inventors: Junji Abe, Komaki (JP); Kei Okumura, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 15/889,482

(22) Filed: Feb. 6, 2018

(65) Prior Publication Data

US 2018/0266513 A1 Sep. 20, 2018

(30) Foreign Application Priority Data

Mar. 16, 2017 (JP) ................................ 2017-050902

(51) Int. Cl.
*F16F 13/10* (2006.01)
*F16F 3/087* (2006.01)
*B60K 5/12* (2006.01)

(52) U.S. Cl.
CPC .......... *F16F 13/108* (2013.01); *B60K 5/1208* (2013.01); *B60K 5/1283* (2013.01); *B60K 5/1291* (2013.01); *F16F 3/0873* (2013.01); *F16F 13/10* (2013.01); *F16F 2226/04* (2013.01)

(58) Field of Classification Search
CPC .......... F16F 1/36; F16F 1/3713; F16F 3/0873; F16F 3/10; F16F 3/103; F16F 3/108; F16F 15/08; F16F 15/022; F16F 2226/04; F16F 2236/04; F16F 2236/123; B60K 5/1208
USPC ........ 267/141, 140.11, 140.13, 140.4, 140.2, 267/219
See application file for complete search history.

(56) References Cited

U.S. PATENT DOCUMENTS 5,964,456 A * 10/1999 Someya .................. F16F 13/10 267/140.13
2005/0242481 A1* 11/2005 Ihara ....................... F16F 1/373 267/141

(Continued)

FOREIGN PATENT DOCUMENTS

JP 2001-099230 A 4/2001
JP 6427095 B2 2/2014

(Continued)

*Primary Examiner* — Robert A. Siconolfi
*Assistant Examiner* — San M Aung
(74) *Attorney, Agent, or Firm* — Oliff PLC

(57) ABSTRACT

A vibration-damping device comprising: first and second attachment members connected elastically by a main rubber elastic body; an inner bracket fixed to the first attachment member with its basal end superposed on an outside end face of the first attachment member while extending laterally relative to the first attachment member; a bag-shaped stopper rubber mounted covering the basal end of the inner bracket in a non-adhesive way; a through hole formed in the stopper rubber so that the first attachment member inserted through it and the inner bracket are mutually fixed; and an elastic contact part provided at a rim of the through hole and pressed against an outer peripheral face of the first attachment member from a distal end side of the inner bracket so that the stopper rubber is positioned relative to the inner bracket in extension direction of the inner bracket.

10 Claims, 9 Drawing Sheets

(56) References Cited

U.S. PATENT DOCUMENTS

| | | | | |
|---|---|---|---|---|
| 2015/0276010 | A1* | 10/2015 | Nakamura | F16F 15/08 248/634 |
| 2015/0345583 | A1* | 12/2015 | Ishikawa | F16F 3/0873 248/634 |
| 2016/0341275 | A1* | 11/2016 | Kaneko | F16F 15/08 |

FOREIGN PATENT DOCUMENTS

| | | | |
|---|---|---|---|
| JP | 6449052 | B2 | 3/2014 |
| WO | 2006/033169 | A1 | 3/2006 |

* cited by examiner

VIBRATION-DAMPING DEVICE

INCORPORATED BY REFERENCE

The disclosure of Japanese Patent Application No. 2017-050902 filed on Mar. 16, 2017 including the specification, drawings and abstract is incorporated herein by reference in its entirety.

BACKGROUND OF THE INVENTION

1. Field of the Invention

The present invention relates to a vibration-damping device adapted for use as an automotive engine mount or the like. Especially, this invention relates to a vibration-damping device which has a structure wherein a first attachment member and an inner bracket are mutually fixed with the basal end of the inner bracket superposed on the outside end face of the first attachment member, and a stopper rubber is attached to the basal end of the inner bracket.

2. Description of the Related Art

Conventionally, there is known a vibration-damping device adapted for use as an automotive engine mount or the like. This vibration-damping device has a structure wherein a first attachment member and a second attachment member are elastically connected by a main rubber elastic body. The first attachment member and the second attachment member are attached to a respective one of components of a vibration transmission system such as a power unit and a vehicle body. Thus, the first attachment member and the second attachment member are interposed between the components of the vibration transmission system.

For the vibration-damping device, there is proposed a structure including an inner bracket disposed between the first attachment member and the component of the vibration transmission system. For example, as Japanese Patent No. JP-B-5449052 discloses, with the basal end of the inner bracket superposed on the upper face of the first attachment member, the basal end of the inner bracket is fixed to the first attachment member, and the inner bracket extends out to a side relative to the first attachment member.

In the vibration-damping device described in JP-B-5449052, the stopper rubber is mounted on the basal end of the inner bracket. The stopper rubber has a bag shape opening toward the distal end side of the inner bracket, and the stopper rubber is attached to cover the basal end of the inner bracket in a non-adhesive way. The inner bracket touches an outer bracket attached to the second attachment member via the stopper rubber, thereby constituting a stopper that limits the relative displacement amount of the first attachment member and the second attachment member.

In this vibration-damping device of JP-B-5449052, the stopper rubber is attached to cover the inner bracket, without being bonded to the inner bracket, so that there are cases where the stopper rubber moves relative to the inner bracket when the stopper load acts, etc. However, depending on the characteristics of the vehicle, there are cases where the stopper rubber is required to be positioned relative to the inner bracket to a high degree. For such cases, a structure that can meet the requirement without necessity for a bonding step, or the like is required.

SUMMARY OF THE INVENTION

It is therefore one object of this invention to provide a vibration-damping device of novel structure which is able to mount the stopper rubber to the inner bracket that is fixed to the first attachment member in a non-adhesive way so as to easily position it.

The above and/or optional objects of this invention may be attained according to at least one of the following modes of the invention. The following modes and/or elements employed in each mode of the invention may be adopted at any possible optional combinations.

Specifically, a first mode of the present invention provides a vibration-damping device comprising: a first attachment member; a second attachment member; a main rubber elastic body elastically connecting the first attachment member and the second attachment member to each other; an inner bracket being fixed to the first attachment member, with a basal end of the inner bracket superposed on an outside end face of the first attachment member, the inner bracket extending out to a side relative to the first attachment member; a bag-shaped stopper rubber mounted on the basal end of the inner bracket in a non-adhesive way so as to cover the basal end; a through hole formed in the stopper rubber so that the first attachment member inserted through the through hole and the inner bracket are fixed to each other; and an elastic contact part provided at a rim of the through hole in the stopper rubber, the elastic contact part being pressed against an outer peripheral face of the first attachment member from a distal end side of the inner bracket so that the stopper rubber is positioned relative to the inner bracket in an extension direction of the inner bracket.

According to this vibration-damping device structured following the first mode, the elastic contact part of the stopper rubber is pressed against the outer peripheral face of the first attachment member from the distal end side of the inner bracket. This positions the stopper rubber relative to the inner bracket in the extension direction of the inner bracket, thereby realizing the target stopper characteristics, durability, and the like.

Besides, the stopper rubber is made to cover the inner bracket, and the elastic contact part is pressed against the outer peripheral face of the first attachment member. This makes it possible to position the stopper rubber relative to the inner bracket without requiring a special positioning work such as bonding of the stopper rubber to the inner bracket.

A second mode of the present invention provides the vibration-damping device according to the first mode, wherein the stopper rubber has a bag shape that includes a tubular peripheral wall which is mounted externally about the basal end of the inner bracket, and a base wall which obstructs an opening of the peripheral wall, and the peripheral wall of the stopper rubber is elastically fitted externally on the basal end of the inner bracket, while the first attachment member and the inner bracket are elastically clamped between the elastic contact part provided in the peripheral wall and the base wall so that the stopper rubber is positioned relative to the inner bracket.

According to the second mode, the stopper rubber is positioned relative to the inner bracket in a plurality of directions by tightening of the peripheral wall that is mounted externally about the inner bracket and pressing contact of the elastic contact part and the base wall against the inner bracket. This holds the stopper rubber in an appropriate position relative to the inner bracket, thus advantageously getting the target stopper characteristics, durability, and the like.

A third mode of the present invention provides the vibration-damping device according to the first or second mode, wherein the elastic contact part has a tapered shape that grows gradually thinner as it goes to a side of the first attachment member.

According to the third mode, the contact position of the elastic contact part on the outer peripheral face of the first attachment member can be adjusted by the angle of the tapered shape, etc. For example, it is possible to avoid the elastic contact part from being pressed against the concavity and convexity of the outer peripheral face of the first attachment member, and the like. Therefore, it is possible to suitably press the elastic contact part against the outer peripheral face of the first attachment member, thereby effectively positioning the stopper rubber and the inner bracket relative to each other.

Especially, if the face of the elastic contact part on the side of the inner bracket is made a tapered face that slants such that it becomes gradually remoter from the inner bracket as it goes to the side of the first attachment member, the elastic contact part is less likely to be clamped between the first attachment member and the inner bracket when the first attachment member and the inner bracket are fixed.

A fourth mode of the present invention provides the vibration-damping device according to any one of the first through third modes, wherein a contact end to the first attachment member in the elastic contact part has a face shape expanding with a prescribed width in a penetration direction of the through hole.

According to the fourth mode, the elastic contact part is pressed against the outer peripheral face of the first attachment member in a face contact state, thereby ensuring the contact area between the elastic contact part and the outer peripheral face of the first attachment member. This more advantageously realizes positioning of the stopper rubber by pressing the elastic contact part against the outer peripheral face of the first attachment member.

A fifth mode of the present invention provides the vibration-damping device according to any one of the first through fourth modes, wherein the stopper rubber has a bag shape that includes a tubular peripheral wall which is mounted externally on the basal end of the inner bracket, and a base wall which obstructs an opening of the peripheral wall, and a thickness of the elastic contact part is smaller than any of a maximum thickness of the peripheral wall and a maximum thickness of the base wall.

According to the fifth mode, the thickness of the elastic contact part that is pressed against the outer peripheral face of the first attachment member is made smaller than each maximum thickness of the peripheral wall and the base wall of the stopper rubber. This reduces the reaction force acting on the stopper rubber by the elastic contact part being pressed against the outer peripheral face of the first attachment member. As a result, it becomes easier to keep the stopper rubber in an appropriate position relative to the inner bracket.

A sixth mode of the present invention provides the vibration-damping device according to any one of the first through fifth modes, wherein the stopper rubber has a bag shape that includes a tubular peripheral wall which is mounted externally about the basal end of the inner bracket, and a base wall which obstructs an opening of the peripheral wall, and an opening end portion opposite to the base wall in the peripheral wall is provided with an annular distal end fitting part that is elastically fitted externally about the inner bracket.

According to the sixth mode, the annular distal end fitting part is provided at the opening end portion of the bag-shaped stopper rubber, and the distal end fitting part is fitted externally about the inner bracket. Hence, the stopper rubber is positioned in a more stable attachment state relative to the inner bracket, thereby favorably stabilizing the stopper characteristics and improving the durability, and the like.

A seventh mode of the present invention provides the vibration-damping device according to any one of the first through sixth modes, wherein the stopper rubber is provided with a stress moderating part that protrudes to the distal end side of the inner bracket relative to the elastic contact part, while the stress moderating part extends slanting relative to a contact direction between the elastic contact part and the outer peripheral face of the first attachment member.

According to the seventh mode, for example, even when the stopper rubber is held by the inner bracket on the distal end side of the elastic contact part, the force that presses the elastic contact part against the outer peripheral face of the first attachment member is adjusted by the stress moderating part that extends slanting relative to the force action direction. Therefore, the elastic contact part is pressed against the outer peripheral face of the first attachment member with appropriate force. Additionally, the reaction force acting on the stopper rubber by the pressing contact of the elastic contact part against the outer peripheral face of the first attachment member is decreased by the stress moderating part that extends slanting relative to the reaction force action direction. This avoids deviation of the stopper rubber due to the reaction force, and the like.

An eighth mode of the present invention provides the vibration-damping device according to the seventh mode, wherein the stopper rubber is provided with a contact retaining part that is superposed on a part remote to the distal end side of the inner bracket relative to the elastic contact part, while the elastic contact part and the contact retaining part connect with each other via the stress moderating part.

According to the eighth mode, the reaction force due to the pressing contact of the elastic contact part on the outer peripheral face of the first attachment member is adjusted by the stress moderating part and exerted on the contact retaining part. Thus, for example, it is possible to prevent the contact retaining part from being moved relative to the inner bracket by the action of the reaction force. In addition, superposition of the contact retaining part on the inner bracket may cause a force to act in such a direction that the elastic contact part is pressed against the first attachment member. Even in this case, the stress moderating part disposed between the contact retaining part and the elastic contact part adjusts the force transmitted to the elastic contact part, so that the elastic contact part is pressed against the outer peripheral face of the first attachment member moderately.

A ninth mode of the present invention provides the vibration-damping device according to the eighth mode, wherein both the elastic contact part and the contact retaining part are abutted and superposed to the inner bracket, while a gap is formed between the stress moderating part and the inner bracket.

According to the ninth mode, the elastic contact part is held by the inner bracket in contact therewith. By so doing, the elastic contact part is stably pressed against the outer peripheral face of the first attachment member in a prescribed location. Meanwhile, the contact retaining part is held by the inner bracket in contact therewith, so that the stopper rubber is positioned relative to the inner bracket also on the distal end side. Besides, the stress moderating part that links the elastic contact part and the contact retaining part is disposed as remote from the inner bracket. As a result, the stress moderating part becomes easily deformable without being constrained by the inner bracket, so that the stress moderating part effectively adjusts force transmission between the elastic contact part and the contact retaining part.

A tenth mode of the present invention provides the vibration-damping device according to any one of the seventh through ninth modes, wherein the stress moderating part has a plate shape extending in the contact direction between the elastic contact part and the outer peripheral face of the first attachment member while slanting relative to a thickness direction.

According to the tenth mode, the stress moderating part has a plate shape and slants relative to the thickness direction. Consequently, when the force in the contact direction between the elastic contact part and the outer peripheral face of the first attachment member acts on the stress moderating part, the stress moderating part easily deforms. Therefore, for example when the reaction force due to the pressing contact of the elastic contact part against the outer peripheral face of the first attachment member etc. is applied to the stress moderating part, or the like, deformation of the stress moderating part effectively reduces the force transmission.

An eleventh mode of the present invention provides the vibration-damping device according to the tenth mode, wherein the stress moderating part has a curved plate shape that is curved in the thickness direction.

According to the eleventh mode, the stress moderating part has a curved plate shape, and the inclination angle in the thickness direction of the stress moderating part changes continuously. Thus, for example, in relation to a comparatively small input on the stress moderating part, a part in the stress moderating part with a large inclination angle undergoes deformation, thereby effectively exhibiting the adjustment action of action force transmission by the deformation of the stress moderating part.

According to the present invention, the elastic contact part provided at the rim of the through hole in the stopper rubber is pressed against the outer peripheral face of the first attachment member from the distal end side of the inner bracket. This positions the stopper rubber relative to the inner bracket in the extension direction of the inner bracket. Owing to this, it is possible to position the stopper rubber relative to the inner bracket in the extension direction of the inner bracket, without requiring a special positioning work such as bonding of the stopper rubber to the inner bracket. Therefore, the target stopper characteristics, durability, and the like can be realized.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

Figure 1:
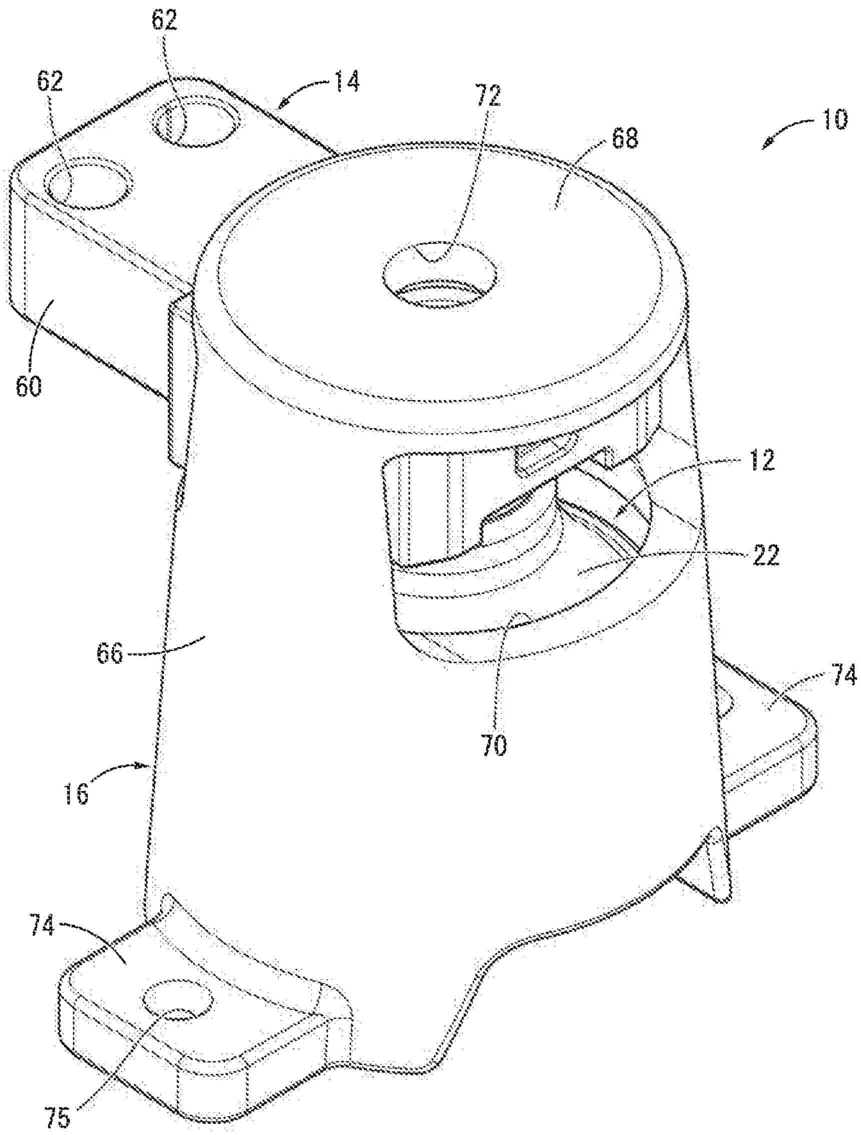
FIG. 1 is a perspective view showing a vibration-damping device in the form of an engine mount as a first embodiment of the present invention.

An embodiment of the present invention will be described below in reference to the drawings.

FIGS. 1 through 4 show an automotive engine mount 10 as a first embodiment of a vibration-damping device constructed following the present invention. The engine mount 10 has a structure wherein an inner bracket 14 and an outer bracket 16 are mounted on a mount main body 12. The mount main body 12 includes a first attachment member 18, a second attachment member 20, and a main rubber elastic body 22 elastically connecting the attachment members. In the description hereafter, as a general rule, the up-down direction means the up-down direction in FIG. 2, the front-back direction means the left-right direction in FIG. 3, and the left-right direction means the left-right direction in FIG. 2.

More specifically, the first attachment member 18 is a member of high rigidity made of metal, fiber-reinforced synthetic resin, or the like. The first attachment member 18 has a shape of a generally circular post with a small diameter, wherein the lower part thereof is tapered with its diameter gradually reduced as it goes to the lower side. Additionally, in the first attachment member 18, a screw hole 24 is formed extending on the central axis thereof to open to the upper face.

The second attachment member 20 is a member of high rigidity as well as the first attachment member 18, in a roughly cylindrical shape with a thin wall and a large diameter. The first attachment member 18 and the second attachment member 20 are co-axially disposed in the up-down direction. The first attachment member 18 and the second attachment member 20 are elastically connected by the main rubber elastic body 22.

The main rubber elastic body 22 has a substantially truncated cone shape. The small-diameter side end of the main rubber elastic body 22 is bonded by vulcanization on the first attachment member 18, while the outer circumferential face of the large-diameter side end thereof is bonded by vulcanization on the second attachment member 20. As a result, the upper opening of the second attachment member 20 is closed by the main rubber elastic body 22. The main rubber elastic body 22 takes the form of an integrally vulcanization molded component incorporating the first attachment member 18 and the second attachment member 20.

Moreover, in the main rubber elastic body 22, a concavity 26 is formed in a shape of an inverted bowl opening to the axial end face on the large-diameter side. Furthermore, with the outer circumferential end of the main rubber elastic body 22, a seal rubber layer 28 is integrally formed to extend out downward. The seal rubber layer 28 has a roughly cylindrical shape with a thin wall and a large diameter, and it is bonded by vulcanization on the inner circumferential face of the second attachment member 20.

Meanwhile, the lower opening of the second attachment member 20 is closed by a flexible film 30. The flexible film 30 is formed with a rubber film that has a shape of a thin-walled approximately circular dome as a whole. The flexible film 30 is allowed to undergo extension/contraction or flexural deformation, with the slack in the initial shape. On the outer circumferential end of the flexible film 30, an annular fixing member 32 is bonded by vulcanization. With the fixing member 32 inserted in the lower end part of the second attachment member 20, the second attachment member 20 is subjected to a diameter reduction process such as 360-degree radial compression. By so doing, the fixing member 32 is fitted in the lower end part of the second attachment member 20, so that the lower opening of the second attachment member 20 is obstructed fluid-tightly by the flexible film 30.

In this way, the flexible film 30 is fluid-tightly attached to the second attachment member 20 of an integrally vulcanization molded component of the main rubber elastic body 22. Consequently, a fluid chamber 34 that is fluid-tightly partitioned from outside with a non-compressible fluid or liquid sealed therein is defined between the main rubber elastic body 22 and the flexible film 30 on the inner circumferential side of the second attachment member 20. The non-compressible fluid filled in the fluid chamber 34 is not particularly limited, but liquids such as water, ethylene glycol, alkylene glycol, polyalkylene glycol, silicone oil, and mixtures of some of them can be preferably adopted. Besides, for efficiently obtaining the vibration-damping effect based on the flowing action of the fluid described later, it is desirable to use a low-viscosity fluid having viscosity of 0.1 Pa·s or lower as the fluid filled in the fluid chamber 34.

In the fluid chamber 34, a partition member 36 is disposed. The partition member 36 is a rigid member formed using a metal, a synthetic resin, or the like, in a nearly circular disk shape as a whole. Additionally, on the outer circumferential end part of the partition member 36, a circumferential groove 38 is formed opening to the outer circumferential face while extending in a spiral form with a length less than two circumferences in the circumferential direction. With the partition member 36 inserted in the second attachment member 20 to which the seal rubber layer 28 is fixed, the second attachment member 20 is subjected to a diameter reduction process. This fits the partition member 36 in the axially middle portion of the second attachment member 20. The outer circumferential face of the partition member 36 and the inner circumferential face of the second attachment member 20 are superposed to each other fluid-tightly via the seal rubber layer 28. Consequently, the second attachment member 20 fluid-tightly covers the outer circumferential opening of the circumferential groove 38 formed in the partition member 36.

In this way, the partition member 36 is disposed in the fluid chamber 34, in a supported state by the second attachment member 20 via the seal rubber layer 28, so that the fluid chamber 34 is divided into two in the up-down direction by the partition member 36 expanding in the axis-perpendicular direction. Specifically, on the upper side of the partition member 36, there is formed a pressure-receiving chamber 40 for which the wall is partially constituted by the main rubber elastic body 22, and, upon a vibration input, an internal pressure fluctuation is induced. Meanwhile, on the lower side of the partition member 36, there is formed an equilibrium chamber 42 for which the wall is partially constituted by the flexible film 30 to permit changes in volume. The non-compressible fluid filled in the fluid chamber 34 is filled in each of the pressure-receiving chamber 40 and the equilibrium chamber 42.

The pressure-receiving chamber 40 and the equilibrium chamber 42 communicate with each other through an orifice passage 44 formed by the partition member 36. With the orifice passage 44, an end portion of the circumferential groove 38 having a tunnel shape communicates with the pressure-receiving chamber 40 via an upper communication hole 46, while the other end portion thereof communicates with the equilibrium chamber 42 via a lower communication hole 48. Consequently, the orifice passage 44 is formed to extend along the outer circumferential edge of the partition member 36 in the circumferential direction. For the orifice passage 44 of this embodiment, the tuning frequency, which is set by the ratio between the passage cross sectional area and the passage length, is adjusted to a low frequency of about 10 Hz corresponding to engine shake. In the engine mount 10 in a state mounted to the vehicle described later, a vibration of frequency corresponding to engine shake is input between the first attachment member 18 and the second attachment member 20. Then, a fluid flow is induced between the pressure-receiving chamber 40 and the equilibrium chamber 42 via the orifice passage 44. This exhibits the vibration-damping effect on the basis of the flowing action of the fluid.

To the mount main body 12 having this structure, the inner bracket 14 and the outer bracket 16 are mounted.

Figure 5:
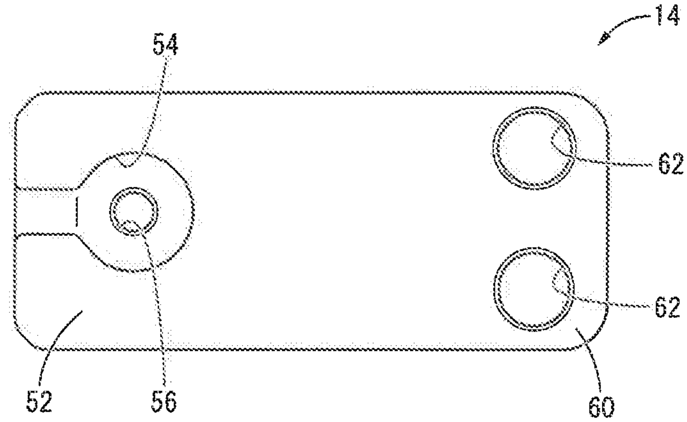
FIG. 5 is a plan view of an inner bracket constituting the engine mount shown in FIG. 1.
Figure 6:
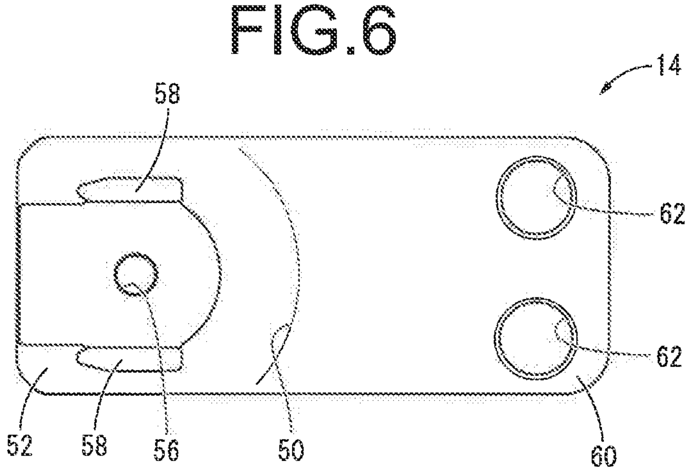
FIG. 6 is a bottom view of the inner bracket shown in FIG. 5.
Figure 7:
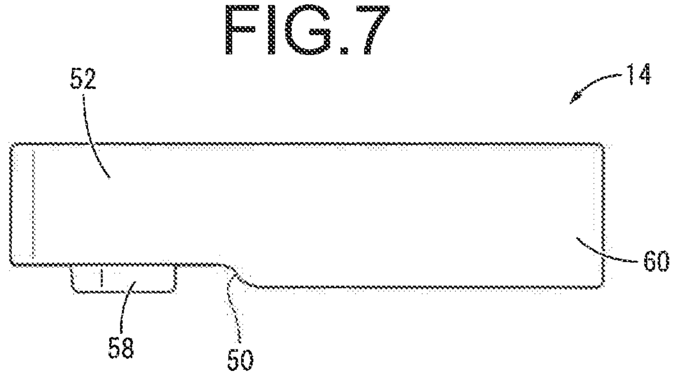
FIG. 7 is a front view of the inner bracket shown in FIG. 5.
Figure 8:
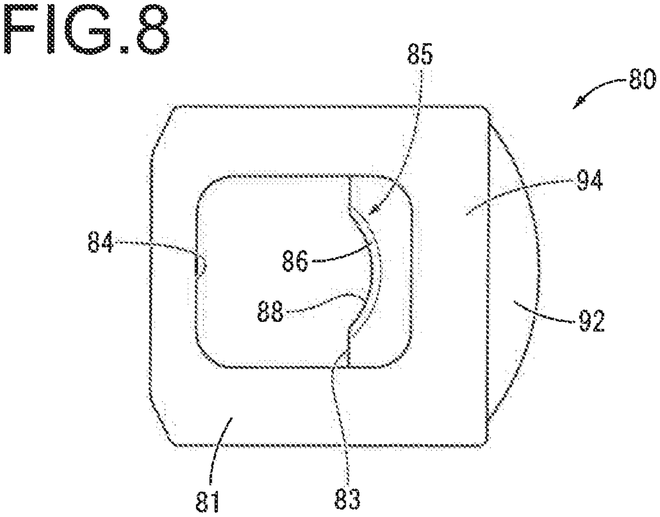
FIG. 8 is a plan view of a stopper rubber constituting the engine mount shown in FIG. 1.

The inner bracket 14 is a high rigidity member made of metal etc., and as FIGS. 5 to 7 show, it has a thick rectangular elongated plate shape that is elongated in the left-right direction as a whole. In the middle portion in the left-right direction of the inner bracket 14, a step 50 is provided in the lower face thereof, so that the basal end side (the left side in FIG. 7) is thinner in the up-down direction than the distal end side (the right side in FIG. 7). In a basal end 52 that is the left end portion of the inner bracket 14, a housing recess 54 for housing a head part of a connection bolt 64 which will be described later is formed to open in the upper face thereof. In addition, a connection bolt hole 56 is formed through the bottom wall of the housing recess 54. In the basal end 52 of the inner bracket 14, a pair of guide projections 58, 58 are disposed to face each other in the front-back direction and project downward. Meanwhile, in a distal end 60 that is the right end portion of the inner bracket 14, two first attachment bolt holes 62 are formed through it in the up-down direction and arranged in the front-back direction.

The lower face of the basal end 52 of the inner bracket 14 is superposed on the upper face of the first attachment member 18, which is the outside end face thereof. Then, the connection bolt 64 is inserted through the connection bolt hole 56 of the basal end 52 and threaded onto the screw hole 24 of the first attachment member 18, so that the inner bracket 14 is fixed to the first attachment member 18 at the basal end 52. When the inner bracket 14 is fixed to the first attachment member 18, the distal end 60 of the inner bracket

14 extends out to a side (the right side) relative to the first attachment member 18. In the present embodiment, the upper end portion of the first attachment member 18 is inserted in the space between the pair of guide projections 58, 58 formed in the basal end 52 of the inner bracket 14. Thus, the first attachment member 18 and the inner bracket 14 are positioned to some extent before fixation of them.

Figure 2:
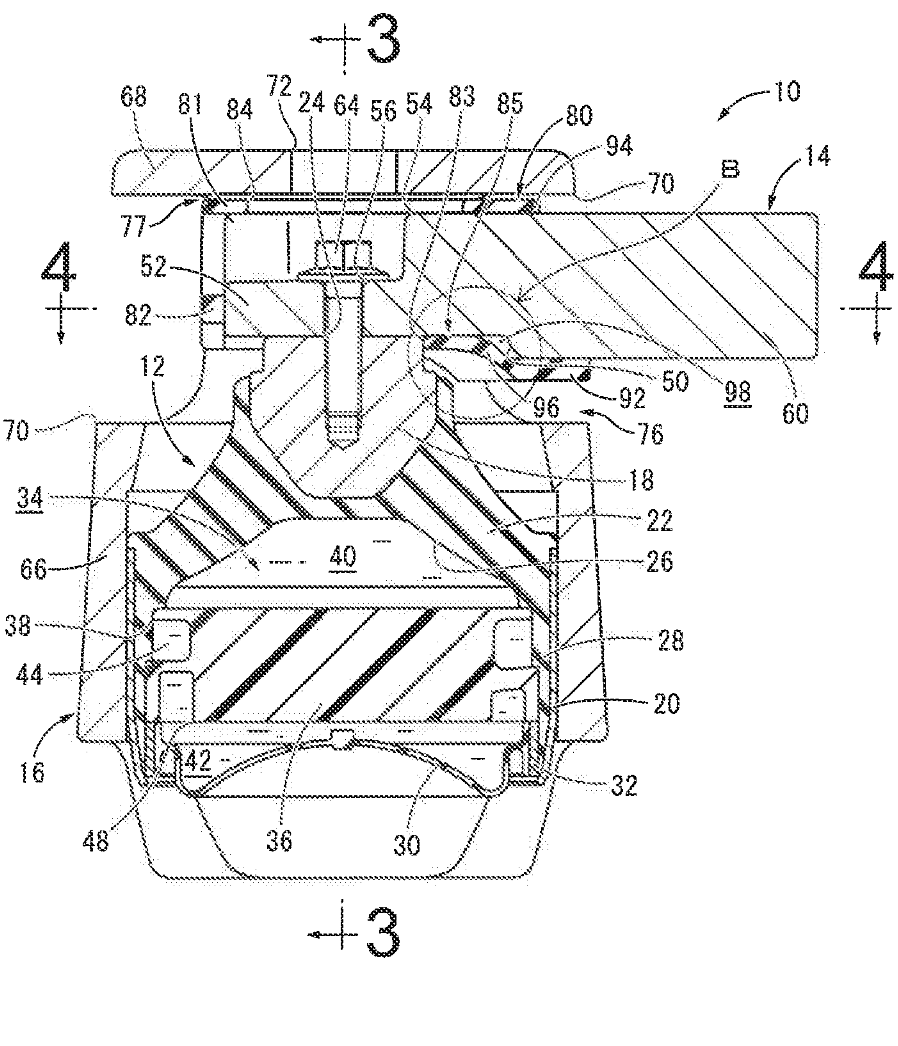
FIG. 2 is a cross sectional view of the engine mount shown in FIG. 1, taken along line 2-2 of FIG. 3.
Figure 3:
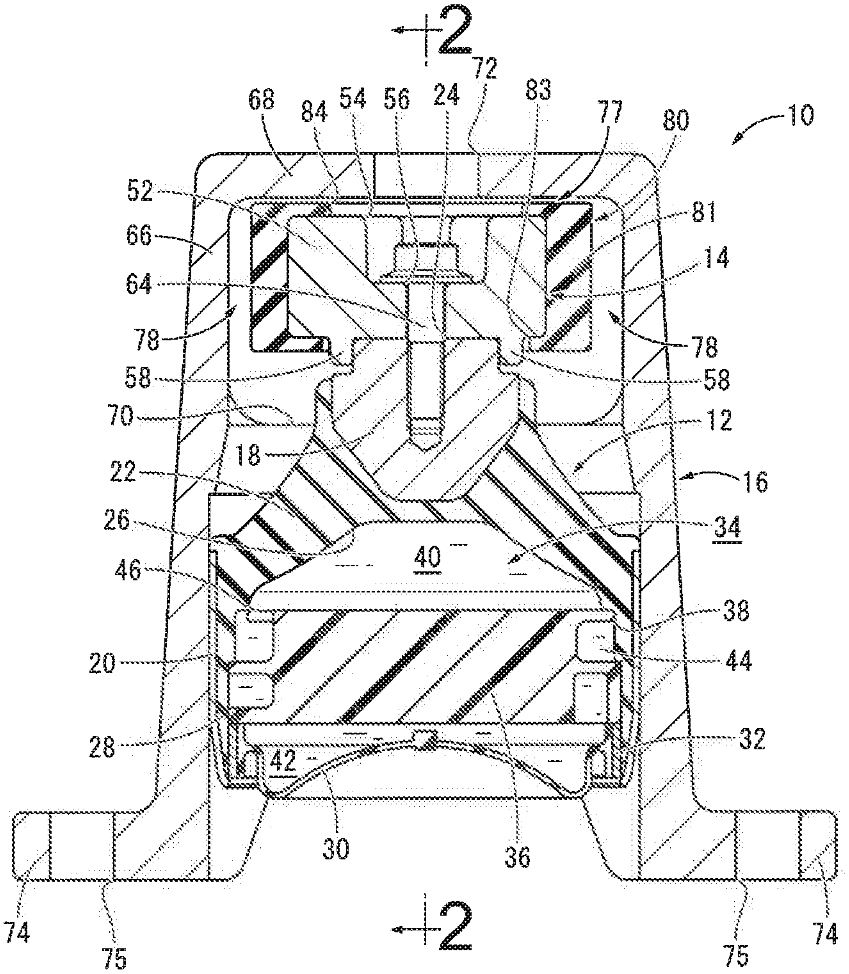
FIG. 3 is a cross sectional view taken along line 3-3 of FIG. 2.
Figure 4:
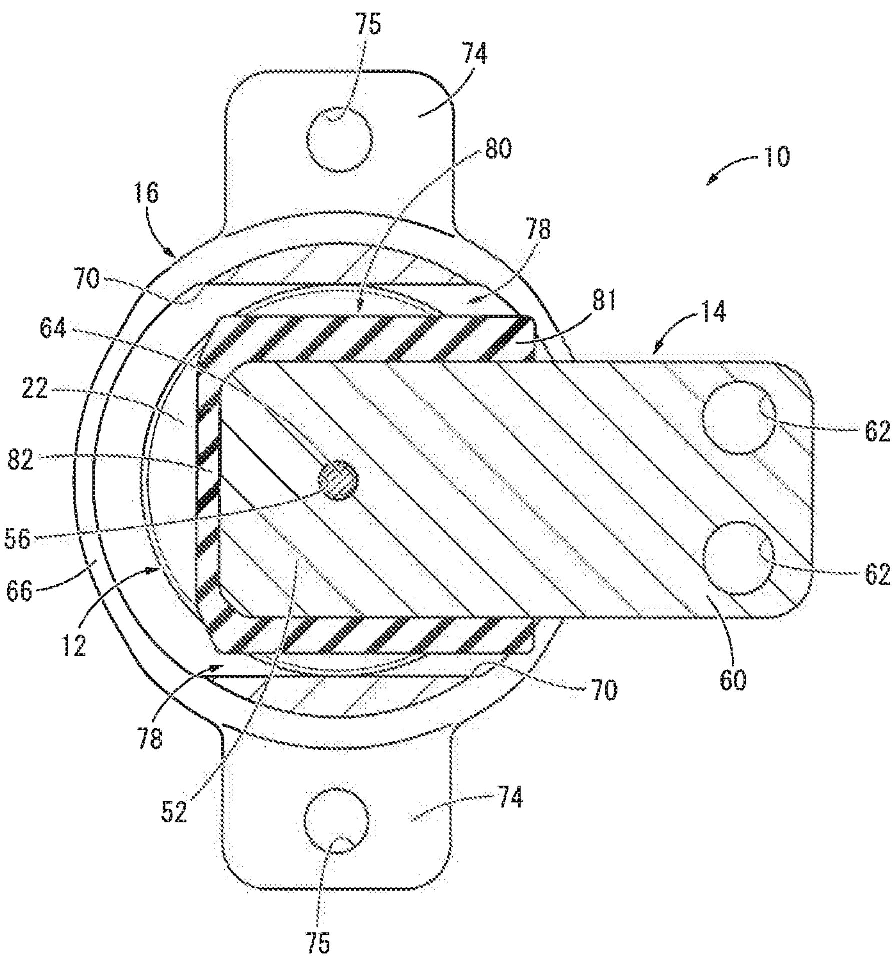
FIG. 4 is a cross sectional view taken along line 4-4 of FIG. 2.

On the other hand, the outer bracket 16 is a member of high rigidity like the inner bracket 14, and as FIGS. 1 to 3 show, it has a shape of an inverted, nearly bottomed cylinder, as a whole. In the outer bracket 16, a pair of windows 70, 70 are formed with a size that is less than a half circumference in the circumferential direction so as to penetrate a tubular wall 66 in the diametrical direction at locations near an upper base wall 68. Moreover, in the upper base wall 68 of the outer bracket 16, an insertion hole 72 is formed through it in the up-down direction. This enables the connection bolt 64 to be inserted through the connection bolt hole 56 via the insertion hole 72 and threaded onto the screw hole 24, during the attachment of the inner bracket 14 to the first attachment member 18 described later. Furthermore, in the lower end portion of the tubular wall 66 of the outer bracket 16, a pair of attachment pieces 74, 74 are formed protruding to both sides of the diametrical direction roughly orthogonal to the opening direction of the pair of windows 70, 70. In each of the pair of attachment pieces 74, 74, a second attachment bolt hole 75 is formed to perforate it in the up-down direction.

The outer bracket 16 is mounted to the mount main body 12 by the tubular wall 66 being fitted and fixed externally about the second attachment member 20. After the outer bracket 16 is mounted to the second attachment member 20 of the mount main body 12, the inner bracket 14 is inserted from a side into the window 70 of the outer bracket 16. Then, the connection bolt 64 is threaded onto the screw hole 24 via the insertion hole 72 of the outer bracket 16, so that the inner bracket 14 is mounted to the first attachment member 18 of the mount main body 12.

With this engine mount 10 wherein the inner bracket 14 and the outer bracket 16 are mounted to the mount main body 12, the distal end 60 of the inner bracket 14 is fixed, using not-shown first attachment bolts inserted through the first attachment bolt holes 62, to a power unit that is not shown, either. For the outer bracket 16 of the engine mount 10, the pair of attachment pieces 74, 74 are fixed, using not-shown second attachment bolts inserted through the second attachment bolt holes 75, 75, to a vehicle body that is not shown, either. Consequently, the engine mount 10 is disposed between the power unit and the vehicle body, so that the power unit and the vehicle body are connected by the engine mount 10 in a vibration-damping manner.

In FIGS. 2 and 3 that show the engine mount 10 prior to attachment to the vehicle, the inner bracket 14 and the upper base wall 68 of the outer bracket 16 are disposed to be near one another. In the mounted state to the vehicle, the inner bracket 14 and the upper base wall 68 of the outer bracket 16 are disposed to be remoter in the up-down direction. Specifically, in the state of the engine mount 10 being mounted on the vehicle, the distributed load of the power unit acts between the first attachment member 18 and the second attachment member 20. As a result, the inner bracket 14 is displaced to the lower side relative to the outer bracket 16, thereby separating the inner bracket 14 and the upper base wall 68 of the outer bracket 16 in the up-down direction.

In this state of the engine mount 10 being mounted on the vehicle, a stopper is constituted to limit the relative displacement amount between the first attachment member 18 and the second attachment member 20 by contact between the inner bracket 14 and the outer bracket 16. Specifically, the lower face of the inner bracket 14 and the inner peripheral face of the window 70 of the outer bracket 16 are abutted to each other, thereby constituting a bound stopper 76 that limits the relative displacement amount in the up-down approach direction between the first attachment member 18 and the second attachment member 20. Also, the upper face of the inner bracket 14 and the lower face of the upper base wall 68 of the outer bracket 16 are abutted to one another, thereby constituting a rebound stopper 77 that limits the relative displacement amount in the up-down separation direction between the first attachment member 18 and the second attachment member 20. Additionally, each of the front-back faces of the inner bracket 14 and the inner circumferential face of the tubular wall 66 of the outer bracket 16 are abutted to one another, thereby constituting a front-back stopper 78 that limits the relative displacement amount in the front-back direction between the first attachment member 18 and the second attachment member 20.

Here, a stopper rubber 80 is disposed between the contact faces for each of the stoppers 76, 77, 78 so that the contact faces for each of the stoppers 76, 77, 78 get in contact indirectly via the stopper rubber 80. The stopper rubber 80 is made of rubber elastic body, resin elastomer, or the like. As FIGS. 8 through 13 show, the stopper rubber 80 integrally includes a peripheral wall 81 having a substantially rectangular tube shape and a base wall 82 that is provided to obstruct the left opening of the peripheral wall 81. Consequently, the stopper rubber 80 has a rectangular bag shape opening to the right side, as a whole.

In the lower wall of the peripheral wall 81, a through hole 83 is formed to penetrate it in the up-down direction, and the through hole 83 has a hole shape such that the upper part of the first attachment member 18 can be inserted through it. An insertion window 84 is formed through the upper wall of the peripheral wall 81 in the up-down direction.

Figure 9:
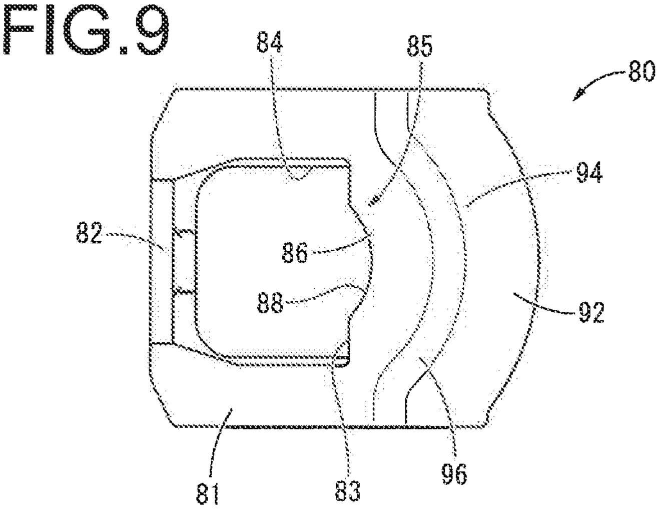
FIG. 9 is a bottom view of the stopper rubber shown in FIG. 8.
Figure 10:
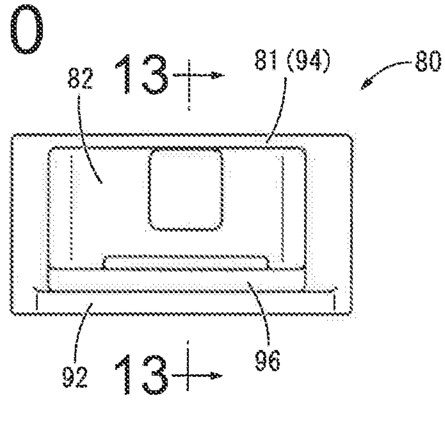
FIG. 10 is a right side view of the stopper rubber shown in FIG. 8.
Figure 11:
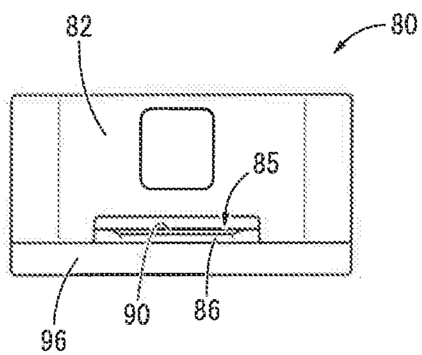
FIG. 11 is a left side view of the stopper rubber shown in FIG. 8.
Figure 12:
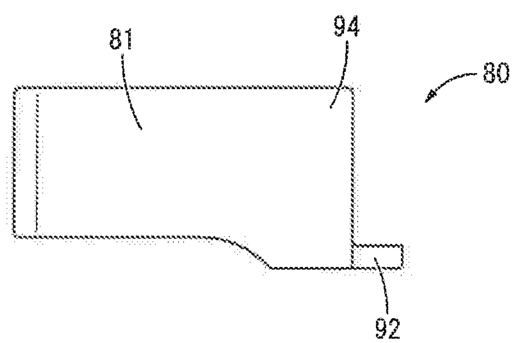
FIG. 12 is a front view of the stopper rubber shown in FIG. 8.
Figure 13:
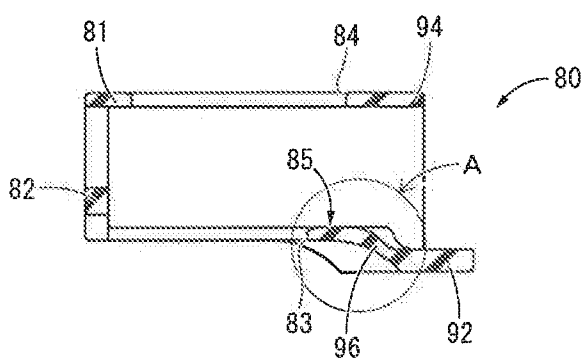
FIG. 13 is a cross sectional view taken along line 13-13 of FIG. 10.
Figure 14:
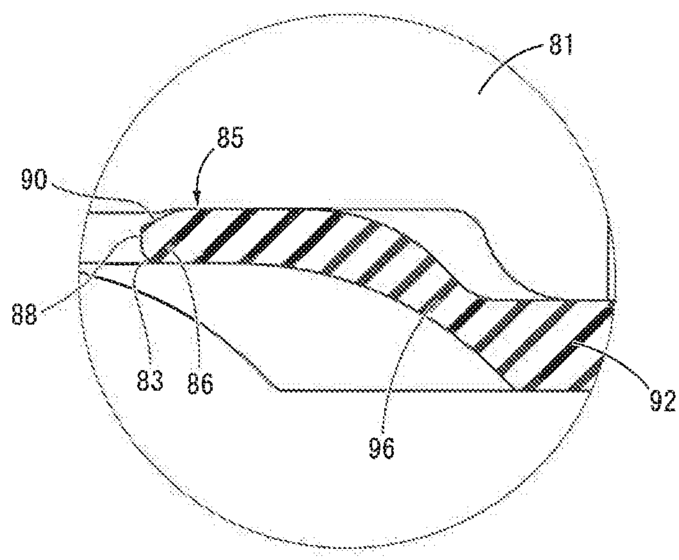
FIG. 14 is a fragmentary enlarged view of a principal part, or Part A, of FIG. 13.

As FIGS. 9, 13, 14, and the like show, an elastic contact part 85 that constitutes a portion of the opening peripheral part of the through hole 83 is provided in the lower wall of the peripheral wall 81 on the right side of the through hole 83. This elastic contact part 85 is a part of the peripheral wall 81 and has a plate shape extending in the left-right direction. With the elastic contact part 85, the left end portion on the side of the through hole 83 is a tapered end part 86 having a tapered shape that grows gradually thinner as it goes toward the through hole 83. Besides, the left end of the tapered end part 86 is a contact end face 88 having a face shape with a prescribed width in the up-down direction. This contact end face 88 constitutes a portion of the inner peripheral face of the through hole 83.

The thickness dimension of the elastic contact part 85 is made smaller than any of the maximum thickness of the peripheral wall 81 and the maximum thickness of the base wall 82. This reduces the reaction force acting to the stopper rubber 80 based on the elasticity of the elastic contact part 85, when the elastic contact part 85 is pressed against the outer peripheral face of the first attachment member 18 as will be described later. As a result, it becomes easier to retain the stopper rubber 80 at an appropriate position relative to the inner bracket 14.

As FIG. 14 shows, the tapered end part 86 of the present embodiment is formed by making the end part of the upper face of the elastic contact part 85 on the side of the through hole 83 be a slanting plane 90. Alternatively, the tapered end part 86 can be formed by making both the upper face and the lower face as slanting faces that approach one another toward the through hole 83. In short, the tapered end part 86 is formed by making at least one of the upper face and the lower face in the end part of the elastic contact part 85 on the side of the through hole 83 as a slanting face that slants in such a direction that the thickness of the elastic contact part 85 thins down as it goes to the through hole 83. It is also possible that at least one of the upper face and the lower face of the tapered end part 86 is a curved face with varying inclination angle.

Furthermore, on the right side of the elastic contact part 85 in the stopper rubber 80, a bound cushion part 92 is provided serving as a contact retaining part. The bound cushion part 92 has a generally flat plate shape expanding as substantially orthogonal to the up-down direction. The bound cushion part 92 is disposed in a location remote from the elastic contact part 85 to the right side, and positioned lower than the elastic contact part 85. The bound cushion part 92 of this embodiment has a thicker wall in the up-down direction than the elastic contact part 85. The basal end part of the bound cushion part 92 (the right end part in FIG. 13) constitutes the right side opening end part of the peripheral wall 81, so that an annular distal end fitting part 94 is formed including the basal end part of the bound cushion part 92, at the right side opening end part of the peripheral wall 81.

Additionally, a stress moderating part 96 is provided between the elastic contact part 85 and the bound cushion part 92 in the stopper rubber 80. The stress moderating part 96 has a plate shape extending in the left-right direction, and it protrudes to the right side from the elastic contact part 85. Thus, the elastic contact part 85 and the bound cushion part 92 are connected to each other by the stress moderating part 96. The stress moderating part 96 has a slant shape that gradually slants downward as it goes from the side of the elastic contact part 85 to the side of the bound cushion part 92. In this embodiment, the stress moderating part 96 has a curved plate shape that is curved in the thickness direction, and its inclination angle gradually changes in the left-right direction.

Figure 15:
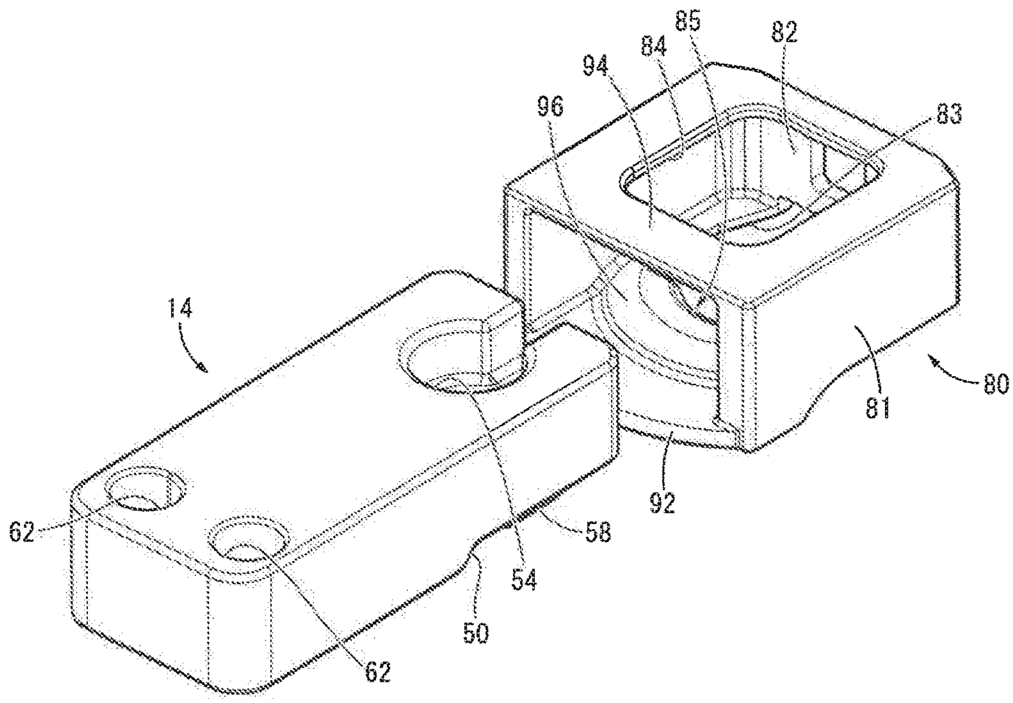
FIG. 15 is a perspective view showing a step of attaching the stopper rubber of FIG. 8 to the inner bracket of FIG. 5.

The stopper rubber 80 of this structure is mounted on the basal end 52 of the inner bracket 14 in a non-adhesive way so as to cover it. Specifically, as FIG. 15 shows, the inner bracket 14 is inserted in the peripheral wall 81 of the stopper rubber 80 from the side of the basal end 52. As FIG. 2 shows, the peripheral wall 81 of the stopper rubber 80 is mounted externally on or about the basal end 52 of the inner bracket 14, while the base wall 82 is superposed on the end face of the inner bracket 14 on the side of the basal end 52.

When the stopper rubber 80 is mounted to the inner bracket 14, the peripheral wall 81 of the stopper rubber 80 is disposed between the inner bracket 14 and the outer bracket 16. Thus, in each of the stoppers for the up-down direction and the front-back direction, the inner bracket 14 and the outer bracket 16 get in contact indirectly via the peripheral wall 81 of the stopper rubber 80. The cushioning action of the stopper rubber 80 enables adjustment of the stopper characteristics, reduction of striking noise during contact, and the like.

The peripheral wall 81 of the stopper rubber 80 is mounted to the basal end 52 of the inner bracket 14, while elastically tightening the basal end 52 of the inner bracket 14. Therefore, the stopper rubber 80 is positioned relative to the inner bracket 14 in the up-down direction and the front-back direction, on the basis of the elasticity of the peripheral wall 81.

The bound cushion part 92 is superposed to the lower face of the inner bracket 14 in contact therewith. In the present embodiment, the basal end portion of the bound cushion part 92 constitutes a portion of the distal end fitting part 94. The distal end fitting part 94 is fitted externally about the inner bracket 14, so that the distal end fitting part 94 is mounted to elastically tighten the inner bracket 14. Therefore, the bound cushion part 92 is pressed against the lower face of the inner bracket 14, at least in the basal end portion. In the base wall 82, a window is formed through it at about the center. The concave groove extending from the housing recess 54 for the bolt head portion to the distal end face in the inner bracket 14 opens to the outside through the window. This enables air venting during the attachment of the stopper rubber 80 to the inner bracket 14, and drainage from the housing recess 54 after the attachment.

With the upper end portion of the first attachment member 18 inserted through the through hole 83 of the stopper rubber 80 from below, the first attachment member 18 and the inner bracket 14 are fixed to each other. In addition, the elastic contact part 85 of the stopper rubber 80 is pressed against the outer peripheral face of the first attachment member 18 that is fixed to the inner bracket 14. The elastic contact part 85 is pressed against the upper part of the outer peripheral face of the first attachment member 18 from the distal end side of the inner bracket 14. The first attachment member 18 is clamped in the left-right direction, which is the extension direction of the inner bracket 14, by the elastic contact part 85 and the base wall 82. This positions the stopper rubber 80 relative to the inner bracket 14 and the first attachment member 18 that if fixed to the inner bracket 14, also in the left-right direction, which is the extension direction of the inner bracket 14.

The elastic contact part 85 is abutted and superposed to the lower face of the inner bracket 14 on the basal end side of the step 50, while the bound cushion part 92 is abutted and superposed to the lower face of the inner bracket 14 on the distal end side of the step 50. Meanwhile, the stress moderating part 96 that links the elastic contact part 85 and the bound cushion part 92 is disposed to be separated to the lower side from the inner bracket 14, thereby forming a gap 98 between the stress moderating part 96 and the inner bracket 14. Although it is desirable that the elastic contact part 85 and the bound cushion part 92 touch the inner bracket 14, the entirety need not always touch the inner bracket 14 and they may be partly separated. Moreover, the stress moderating part 96 is desired to be separated from the inner bracket 14, but its entirety need not necessarily be separated from the inner bracket 14 and it may partly touch the inner bracket 14.

Figure 16:
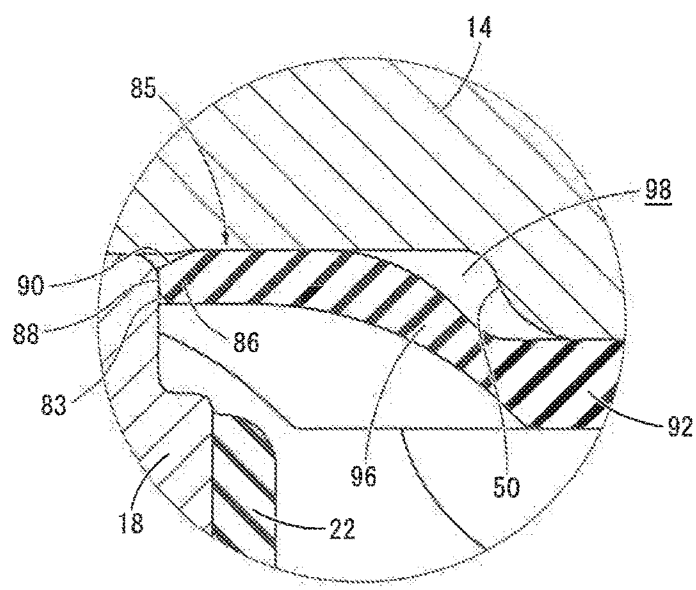
FIG. 16 is a fragmentary enlarged view of a principal part, or Part B, of FIG. 2.

In a state where the stopper rubber 80 is mounted to cover the basal end 52 of the inner bracket 14 in a non-adhesive way like this, the inner bracket 14 is fixed to the first attachment member 18. By so doing, the stopper rubber 80 is positioned relative to the inner bracket 14 and the first attachment member 18, in each of the up-down direction, the front-back direction, and the left-right direction. Particularly, as FIGS. 2 and 16 show, the elastic contact part 85 is pressed against the outer peripheral face of the first attachment member 18, thereby avoiding movement of the stopper rubber 80 to the right side, i.e., the extraction side from the inner bracket 14, without requiring such a means as adhesion.

This avoids the change in the stopper characteristics and local abrasion of the stopper rubber 80 etc. resultant from position deviation of the stopper rubber 80 relative to the inner bracket 14, and the like. As a result, it is possible to effectively get the target stopper characteristics and durability etc.

The annular distal end fitting part 94 provided at the opening end part of the bag-shaped stopper rubber 80 is fitted externally about the inner bracket 14. Consequently, the stopper rubber 80 is positioned relative to the inner bracket 14 in a more stable mounted state, thus favorably stabilizing the stopper characteristics and improving the durability.

The contact end of the elastic contact part 85 to the first attachment member 18 is a contact end face 88 having a prescribed width in the up-down direction. Therefore, the elastic contact part 85 is pressed against the outer peripheral face of the first attachment member 18 in a face contact state. This keeps the contact area between the elastic contact part 85 and the outer peripheral face of the first attachment member 18, thereby more advantageously realizing the positioning of the stopper rubber 80 by pushing the elastic contact part 85 against the outer peripheral face of the first attachment member 18.

The elastic contact part 85 includes the tapered end part 86 that grows gradually thinner as it goes to the side of the first attachment member 18, so that the elastic contact part 85 touches the outer peripheral face of the first attachment member 18 in a middle position in the up-down direction. Consequently, as FIG. 16 shows, also in a case where an R face is set at an upper end corner part of the first attachment member 18, the contact end face 88 of the elastic contact part 85 can be pressed against the outer peripheral face of the first attachment member 18 in a stable constant state. Moreover, in this embodiment, the tapered end part 86 is formed by providing the slanting plane 90 for the upper face of the elastic contact part 85. Therefore, when the first attachment member 18 and the inner bracket 14 are fixed, the tapered end part 86 of the elastic contact part 85 is less likely to be clamped between the first attachment member 18 and the inner bracket 14.

The stress moderating part 96, which extends in the left-right direction while slanting in relation to the thickness direction, is provided for the stopper rubber 80. The stress moderating part 96 extends out from the elastic contact part 85 to the right side, which is the distal end side, while the elastic contact part 85 connects with the bound cushion part 92 of the distal end fitting part 94 via the stress moderating part 96. As a result, in an embodiment wherein the distal end fitting part 94 is positioned relative to the inner bracket 14 or the like, the contact force of the elastic contact part 85 to the first attachment member 18 is adjusted by the stress moderating part 96, and the elastic contact part 85 is pressed against the outer peripheral face of the first attachment member 18 with an appropriate force. Moreover, the reaction force acting on the stopper rubber 80 due to pressing contact of the elastic contact part 85 against the outer peripheral face of the first attachment member 18 is adjusted by the stress moderating part 96. This avoids deviation of the stopper rubber 80 due to the reaction, and the like.

Since the stress moderating part 96 has a plate shape extending in the left-right direction while slanting in relation to the thickness direction, the stress moderating part 96 readily undergoes deformation with respect to an input in the left-right direction. For example, when the reaction force due to the contact between the elastic contact part 85 and the first attachment member 18 is exerted on the stress moderating part 96, the deformation of the stress moderating part 96 effectively decreases force transmission from the elastic contact part 85 to the bound cushion part 92.

In the present embodiment, the stress moderating part 96 has a curved plate shape that is curved in the thickness direction, and the inclination angle in the thickness direction of the stress moderating part 96 changes continuously. Thus, for example, even under a comparatively small input in the left-right direction on the stress moderating part 96, a part of large inclination angle in the stress moderating part 96 deforms, thereby effectively exhibiting the adjustment action of the transmitted force.

Both of the elastic contact part 85 and the bound cushion part 92 are abutted against and superposed to the lower face of the inner bracket 14, while the gap 98 is formed between the stress moderating part 96 and the inner bracket 14. Owing to this, the elastic contact part 85 is positioned along the inner bracket 14 and it is stably pressed against the outer peripheral face of the first attachment member 18. Since the bound cushion part 92 is held in contact with the inner bracket 14, the stopper rubber 80 is positioned by the inner bracket 14, also in the distal end side thereof. Besides, the stress moderating part 96 is separated from the inner bracket 14, so that the stress moderating part 96 is not restrained by the inner bracket 14 and easily deformable. Thus, the degree of the force transmitted between the elastic contact part 85 and the bound cushion part 92 is effectively adjusted by the stress moderating part 96.

The embodiment of the present invention has been described above, but this invention is not limited by the specific description of the embodiment. For example, the stress moderating part 96 of the stopper rubber 80 is not limited to the curved plate shape, and it can have a flat plate shape.

Also, the tapered end part 86 of the stopper rubber 80 is not always limited to ones formed by providing the slanting plane 90 that slants with a constant inclination angle at the end part of the elastic contact part 85. For example, it is possible to form the tapered end part 86 by providing at least one of the upper and lower faces of the end part of the elastic contact part 85 with a slanting curved face with its inclination angle gradually varying, two slanting planes with their inclination angles changing in a stepwise manner, or the like. Additionally, the tapered end part 86 is not indispensable, and the entire elastic contact part 85 may be formed with a nearly constant thickness, for example.

The elastic contact part 85 need not always be abutted and superposed to the inner bracket 14, and it may be remote from the inner bracket 14. Besides, the configuration that the stress moderating part 96 is disposed to be remote from the inner bracket 14 so as to form the gap 98 is not indispensable. The stress moderating part 96 may touch the inner bracket 14 in part or in entirety.

In the aforesaid embodiment, there is shown, as an example of the contact retaining part, the bound cushion part 92 constituting the bound stopper 76. However, as long as the contact retaining part is superposed on the inner bracket 14, the contact retaining part does not have to be a component of the bound stopper 76. Note that the contact retaining part is not necessary in the present invention and can be omitted.

For the engine mount 10 of the above-described embodiment, there is shown, as an example, a fluid-filled vibration-damping device that uses the vibration-damping effect based on the flowing action of the fluid sealed in the fluid chamber 34 therein. However, the vibration-damping device according to the present invention is not necessarily limited to the fluid-filled vibration-damping device, and this invention is applicable also for a so-called solid type vibration-damping device that does not include the fluid chamber 34 inside.

The specific structure for the inner bracket 14 and the outer bracket 16 can be changed as appropriate depending on the attachment structure on the vehicle side, and the like.

The application range of the present invention is not limited to a vibration-damping device used as an engine mount, and it includes vibration-damping devices used as a sub-frame mount, a body mount, a differential mount, and the like, for example. Moreover, the present invention can be applied to not only an automotive vibration-damping device, but also vibration-damping devices for use in a motorcycle, a rail vehicle, an industrial vehicle, and the like, for example.

What is claimed is:

1. A vibration-damping device comprising:

a first attachment member;

a second attachment member;

a main rubber elastic body elastically connecting the first attachment member and the second attachment member to each other;

an inner bracket being fixed to the first attachment member, with a basal end of the inner bracket superposed on an outside end face of the first attachment member, the inner bracket extending out to a side relative to the first attachment member;

a bag-shaped stopper rubber mounted on the basal end of the inner bracket in a non-adhesive way so as to cover the basal end;

a through hole formed in the stopper rubber so that the first attachment member inserted through the through hole and the inner bracket are fixed to each other; and an elastic contact part provided at a rim of the through hole in the stopper rubber, the elastic contact part being pressed against an outer peripheral face of the first attachment member from a distal end side of the inner bracket so that the stopper rubber is positioned relative to the inner bracket in an extension direction of the inner bracket, wherein the stopper rubber is provided with a stress moderating part that protrudes to the distal end side of the inner bracket relative to the elastic contact part, while the stress moderating part extends slanting relative to a contact direction between the elastic contact part and the outer peripheral face of the first attachment member.

2. The vibration-damping device according to claim 1, wherein the stopper rubber has a bag shape that includes a tubular peripheral wall which is mounted externally about the basal end of the inner bracket, and a base wall which obstructs an opening of the peripheral wall, and the peripheral wall of the stopper rubber is elastically fitted externally on the basal end of the inner bracket, while the first attachment member and the inner bracket are elastically clamped between the elastic contact part provided in the peripheral wall and the base wall so that the stopper rubber is positioned relative to the inner bracket.

3. The vibration-damping device according to claim 1, wherein the elastic contact part has a tapered shape that grows gradually thinner as it goes to a side of the first attachment member.

4. The vibration-damping device according to claim 1, wherein a contact end to the first attachment member in the elastic contact part has a face shape expanding with a prescribed width in a penetration direction of the through hole.

5. The vibration-damping device according to claim 1, wherein the stopper rubber has a bag shape that includes a tubular peripheral wall which is mounted externally on the basal end of the inner bracket, and a base wall which obstructs an opening of the peripheral wall, and a thickness of the elastic contact part is smaller than any of a maximum thickness of the peripheral wall and a maximum thickness of the base wall.

6. The vibration-damping device according to claim 1, wherein the stopper rubber has a bag shape that includes a tubular peripheral wall which is mounted externally about the basal end of the inner bracket, and a base wall which obstructs an opening of the peripheral wall, and an opening end portion opposite to the base wall in the peripheral wall is provided with an annular distal end fitting part that is elastically fitted externally about the inner bracket.

7. The vibration-damping device according to claim 1, wherein the stopper rubber is provided with a contact retaining part that is superposed on a part remote to the distal end side of the inner bracket relative to the elastic contact part, while the elastic contact part and the contact retaining part connect with each other via the stress moderating part.

8. The vibration-damping device according to claim 7, wherein both the elastic contact part and the contact retaining part are abutted and superposed to the inner bracket, while a gap is formed between the stress moderating part and the inner bracket.

9. The vibration-damping device according to claim 1, wherein the stress moderating part has a plate shape extending in the contact direction between the elastic contact part and the outer peripheral face of the first attachment member while slanting relative to a thickness direction.

10. The vibration-damping device according to claim 9, wherein the stress moderating part has a curved plate shape that is curved in the thickness direction.

* * * * *